(12) United States Patent
Shaikh et al.

(10) Patent No.: US 9,100,407 B2
(45) Date of Patent: Aug. 4, 2015

(54) METHOD AND SYSTEM TO ENHANCE PERFORMANCE OF A SESSION INITIATION PROTOCOL NETWORK AND ITS ELEMENTS

(75) Inventors: Mohammed Taher Shaikh, Fremont, CA (US); Parameswaran Kumarasamy, San Jose, CA (US); Jayesh Chokshi, Cupertino, CA (US); Vinay Pande, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1561 days.

(21) Appl. No.: 11/388,672

(22) Filed: Mar. 23, 2006

(65) Prior Publication Data

US 2007/0226361 A1   Sep. 27, 2007

(51) Int. Cl.
*G06F 15/16* (2006.01)
*H04L 29/06* (2006.01)
*H04W 28/06* (2009.01)

(52) U.S. Cl.
CPC ............ *H04L 65/1006* (2013.01); *H04L 69/22* (2013.01); *H04W 28/06* (2013.01); *H04L 29/06197* (2013.01)

(58) Field of Classification Search
CPC ................ H04L 65/1006; H04L 69/22; H04L 29/06197; H04W 28/06
USPC .................................................. 709/246, 228
See application file for complete search history.

(56) References Cited

U.S. PATENT DOCUMENTS

| | | | | |
|---|---|---|---|---|
| 6,128,666 | A * | 10/2000 | Muller et al. | 709/238 |
| 6,678,735 | B1 * | 1/2004 | Orton et al. | 709/230 |
| 6,717,949 | B1 * | 4/2004 | Boden et al. | 370/401 |
| 6,724,883 | B1 * | 4/2004 | Lehtinen | 379/230 |
| 6,775,689 | B1 * | 8/2004 | Raghunandan | 709/206 |
| 6,807,173 | B1 * | 10/2004 | Lee et al. | 370/389 |
| 6,976,081 | B2 * | 12/2005 | Worger et al. | 709/230 |
| 7,606,883 | B1 * | 10/2009 | Allibhoy et al. | 709/223 |
| 7,801,953 | B1 * | 9/2010 | Denman et al. | 709/204 |
| 2001/0037500 | A1 * | 11/2001 | Reynolds et al. | 725/36 |
| 2002/0062394 | A1 * | 5/2002 | Bunn et al. | 709/246 |
| 2002/0112073 | A1 * | 8/2002 | MeLampy et al. | 709/240 |
| 2002/0146000 | A1 * | 10/2002 | Jonsson et al. | 370/352 |
| 2003/0028606 | A1 * | 2/2003 | Koopmans et al. | 709/206 |
| 2003/0145115 | A1 * | 7/2003 | Worger et al. | 709/247 |

(Continued)

OTHER PUBLICATIONS

M. Handley et al., RFC 4566, Jul. 2006, Network Working Group, Update for the SDP Protocol.*
Cedric Westphal, Rajeev Koodli; IP Header compression: A Study of Context Establishment; 2003; 2003 IEEE Wireless Communications and Networking Conference Record; 1025-1031, inc lusive (7 Pages).*
Unknown Author;SD, Session Description Protocol (SIP Parameters);Feb. 23, 2005; Network Sorcery.com; 3 Pages.*

(Continued)

*Primary Examiner* — Arvin Eskandarnia
*Assistant Examiner* — Anthony Fabbri
(74) *Attorney, Agent, or Firm* — Haynes and Boone, LLP (57) ABSTRACT

In accordance with at least one embodiment of the present invention, a communication apparatus includes a communication unit configured to send and receive messages on a network. Each message has a message header configured to include a plurality of header fields, where the message header includes a suppression header field that indicates a request to suppress at least one header field in at least one subsequently sent or received message. The communication apparatus is configured to establish a suppressed header field message exchange session with a peer on the network so that at least one subsequent message exchanged between the communication apparatus and the peer is free of at least one suppressible header field.

9 Claims, 10 Drawing Sheets

(56) References Cited

U.S. PATENT DOCUMENTS

| | | | |
|---|---|---|---|
| 2003/0149789 A1* | 8/2003 | Hoffmann | 709/245 |
| 2004/0090989 A1* | 5/2004 | Kobayashi | 370/469 |
| 2004/0147247 A1* | 7/2004 | Demetrescu et al. | 455/412.1 |
| 2004/0162032 A1* | 8/2004 | Li et al. | 455/72 |
| 2005/0144326 A1* | 6/2005 | Sugar et al. | 709/247 |
| 2005/0172032 A1* | 8/2005 | Pessi | 709/246 |
| 2007/0130475 A1* | 6/2007 | Sathyanath et al. | 713/189 |
| 2010/0027497 A1* | 2/2010 | Pelletier | 370/329 |

OTHER PUBLICATIONS

M. Handkey et al.; "SDP: Session Description Protocol", Network Working Group Request for Comments: 2327; http:/www.apps.ietf.org/rfc2327.html; Apr. 1998; (32 pages).

J.Rosenberg et al.; "SIP: Session Initiation Protocol"; Network Working Group Request for Comments: 3261 http:/wwvv.apps.iett.org/rfc3261.html; Jun. 2000; (218 pages).

* cited by examiner

*SIP INVITE MESSAGE WITH FULL HEADERS:* �older 102

*L01:* INVITE sip:6783881501@10.0.1.150:5060 SIP/2.0
*L02:* Via:SIP/2.0/UDP abc.xyz.com;branch=z9hG4bK-alice.abc.xyz.com-64.238.118.209V5060-0-772764762-156 9791189-11289744444723
*L03:* From:<sip:7706900457@abc.xyz.com;user=phone>;tag=15697911 89-11289744444723
*L04:* To:"Line 1 SBA"<sip:6783881501@abc.xyz.com;user=phone>
*L05:* Call-ID:YZ16004472310100554091 2051@abc.xyz.com
*L06:* Begin Message Body
\* \* \*

*FIG 1*
*--PRIOR ART--*

*SIP INVITE MESSAGE WITH COMPACT HEADERS:* ⎯ 202

*L01:* INVITE sip:6783881501@10.0.1.150:5060 SIP/2.0
*L02:* v:SIP/2.0/UDP abc.xyz.com;branch=z9hG4bK-alice.abc.xyz.com-64.238.118.209V5060-0-772764762-156 9791189-11289744444723
*L03:* f:<sip:7706900457@abc.xyz.com;user=phone>;tag=15697911 89-11289744444723
*L04:* t:"Line 1 SBA"<sip:6783881501@abc.xyz.com;user=phone>
*L05:* i:YZ16004472310100554091 2051@abc.xyz.com
*L06:* Begin Message Body
\* \* \*

*SENT INVITE WITH SUPPRESSION MESSAGE HEADER:*

*L01:* INVITE sip:9497778888@15.6.39.10 SIP/2.0
*L02:* From: sip:9498889999@15.6.39.10;tag=1c23623
*L03:* To: sip:9497778888@15.6.39.10
*L04:* Call-Id: call-973574142-2@15.5.27.209
*L05:* Cseq: 1 INVITE
*L06:* Contact: <sip:9498889999@15.5.27.209>
*L07:* Session-Expires: 110
*L08:* Content-Type: application/sdp
*L09:* Content-Length: 304
*L10:* Accept-Language: en
*L11:* Allow: INVITE, ACK, CANCEL, BYE, REFER, OPTIONS, NOTIFY, REGISTER, SUBSCRIBE
*L12:* Supported: sip-cc, sip-cc-01, timer, replaces
*L13:* User-Agent: Pingtel/2.1.11 (VxWorks)
*L14:* Date: Tue, 07 Nov 2000 05:15:42 GMT
*L15:* Via: SIP/2.0/UDP 15.5.27.209
*L16:* Header-suppression: true

*FIG 5*

RECEIVED TRYING WITH SUPPRESSION MESSAGE HEADER:

L01: SIP/2.0 100 Trying
L02: Via: SIP/2.0/UDP 15.6.39.10:5060;branch=z9hG4bK2B58E
L03: From: <sip:9498889999@15.6.39.10;tag=CEA5EC-F1B
L04: To: <sip:9497778888@15.5.27.207>
L05: Call-ID: BF8C339F-348111D6-807BB529-DD405DD@15.6.39.10
L06: Date: Mon, 30 May 2005 19:21:26 GMT
L07: Cseq: 101 INVITE
L08: Server: Cisco-CP7960G/7.5
L09: Contact: <sip:9497778888@15.5.27.207:5060>
L10: Allow: ACK,BYE,CANCEL,INVITE,NOTIFY,OPTIONS,REFER,REGISTER,UPDATE
L11: Content-Length: 0
L12: Header-suppression: true

METHOD AND SYSTEM TO ENHANCE PERFORMANCE OF A SESSION INITIATION PROTOCOL NETWORK AND ITS ELEMENTS

TECHNICAL FIELD

This invention relates generally to electronic communication over a network, and more particularly to enhancing performance of Session Initiation Protocol (SIP) network and its elements.

BACKGROUND

Enterprise and Service Provider Voice over Internet Protocol (VoIP) deployments increasingly use an application-layer control protocol, Session Initiation Protocol (SIP), (a.k.a. Session Initiated Protocol) as the session protocol of choice since there are many different types of network elements that use SIP signaling for VoIP, including telephones, proxies, Internet Protocol Private Branch Exchanges (IP-PBXs), Media Gateway, software bridges (SoftSwitches), Back-to-Back User Agents (B2BUAs), and Session Border Controllers. SIP is specified by an Internet Engineering Task Force (IETF) document Request For Comments (RFC) 3261, also denoted as IETF-RFC3261, which describes SIP as "an application-layer control (signaling) protocol for creating, modifying, and terminating sessions with one or more participants. These sessions include Internet telephone calls, multimedia distribution, and multimedia conferences."

SIP is a text-based protocol, and hence the parsing and building of messages may put a heavy load on various network elements. As the number of SIP VoIP calls increases, so too the processing load on various devices may also increase. This increase can create a bottleneck in some deployments. Worse, some non-terminal, or intermediately positioned network devices like Session Border Controllers handling SIP-to-SIP calls may actually handle two instances of VoIP legs, one sending and one receiving, thus leading to a rapid increase in processor and memory utilization. This processing and parsing burden may negatively impact system scalability, and/or reliability.

Figure 1:
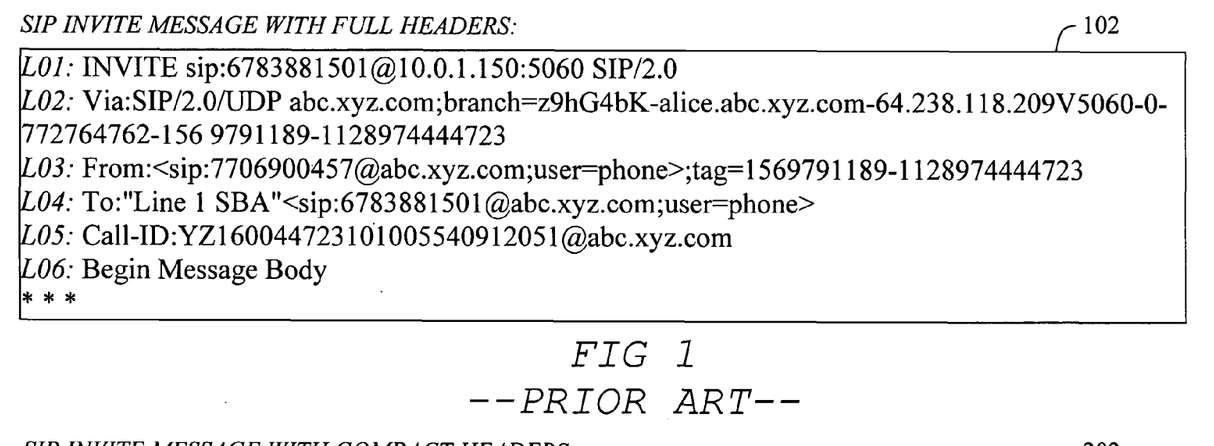
FIG. 1 shows a portion of a conventional SIP INVITE message with full headers.
Figure 2:
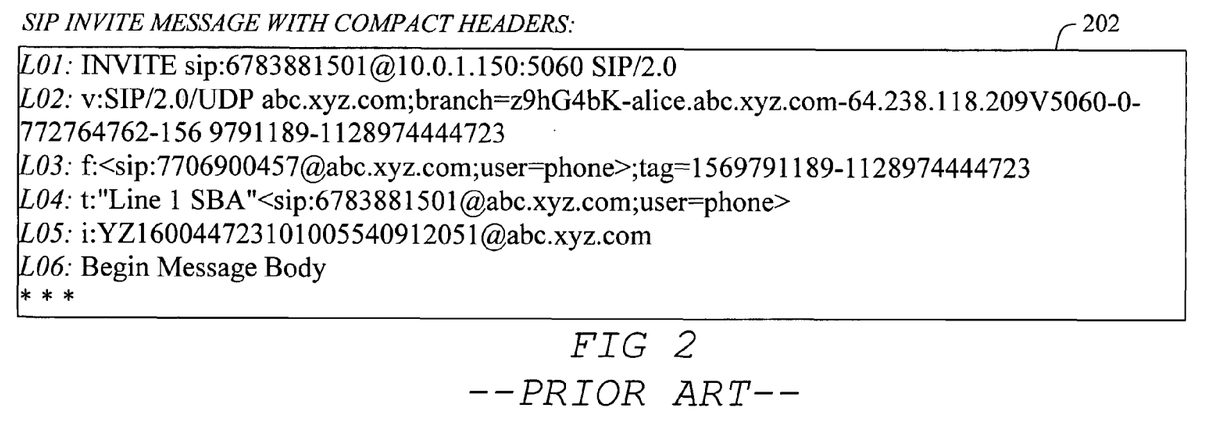
FIG. 2 shows a portion of a conventional SIP INVITE message with compact headers.

One suggested method to reduce the amount of text-based parsing is described in the SIP specification IETF-RFC3261 section 7.3.3 which teaches the use of compact header fields to represent common header field names in an abbreviated form. FIG. 1 shows an exemplary invite message 102 using full SIP headers, while FIG. 2 shows the exemplary invite message of FIG. 1 modified to include compact headers. The line indicators L01: to L06: are not part of the message content, but are merely used to identify particular lines in messages 102 and 202, respectively. For example, FIG. 1 line L02 recites "Via:SIP/2.0/UDP" while the corresponding line in FIG. 2 recites "v:SIP/2.0/UDP", so that the full header field name "Via" is replaced with a compact header field name "v". Similarly, FIG. 1 line L03 recites "From:" while the corresponding line in FIG. 2 recites "f:", so that the full header name "From" field is replaced with a compact header field is "f", and so on.

The use of compact headers may have only a minimal benefit since the bulk of the message may be the header content itself, not the header field descriptors, where the header content still needs to be parsed and re-built for received or sent messages. Accordingly, there is a need in the art for a method and system for enhancing the performance of SIP network elements.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

According to one or more embodiments of the present invention, systems and methods are disclosed that provide an improvement in the performance of Session Initiated Protocol (SIP) network elements due to reduced amount of parsing and rebuilding of network message headers.

Figure 3:
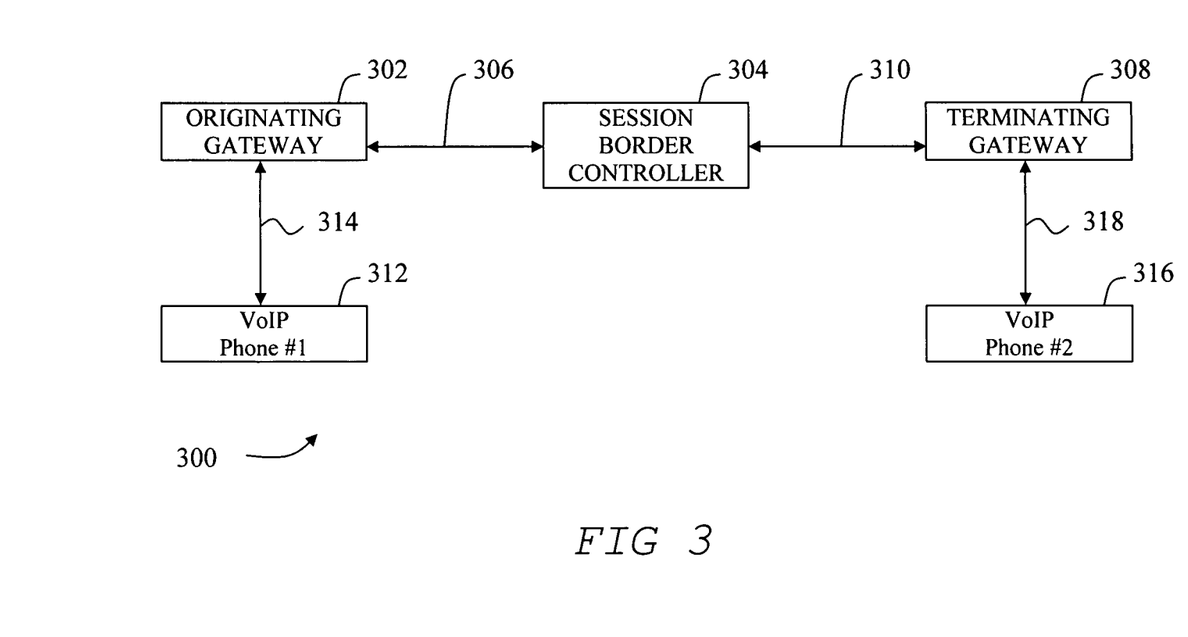
FIG. 3 shows a block diagram view of a portion of a network configured for Voice over Internet Protocol (VoIP) communication, according to an embodiment of the present invention.

FIG. 3 shows a block diagram view of portion of a network 300 configured for Voice over Internet Protocol (VoIP) communication, according to an embodiment of the present invention. Network 300 may include an originating gateway 302, a session border controller 304, and/or a terminating gateway 308. Session Border Controller 304, hereinafter SBC 304, may be a network device located in a communication path between the originator of a VoIP call, denoted as the calling party, and the receiver of the VoIP call, denoted as the called party. SBC 304 can accept VoIP call from the calling party and re-originate VoIP call to the called party. In this manner, SBC 304 may act as an IP-to-IP gateway for the signaling and media traffic comprising the VoIP call. Using an SBC in this manner can provide many benefits including traversal of a firewall or address remapping due to the presence of a Network Address Translator (NAT), improved security by providing insulation of core network devices from attacks, and enhanced Quality of Service (QoS).

Originating gateway 302, hereinafter OG 302, may communicate with session border controller 304 through a communication path 306 that can include a wired connection or a wireless connection configured to exchanging messages according to a message protocol, such as the Internet Protocol (IP). OG 302 may be considered the source gateway for the VoIP call. SBC 304 may communicate with terminating gateway 308 through a communication path 310 that can include a wired connection or a wireless connection configured to exchanging messages according to a message protocol, such as the Internet Protocol (IP). Terminating gateway 308, hereinafter TG 308, may be considered the destination gateway for the VoIP call. In this manner, messages may be passed between originating gateway 302 and terminating gateway 308 through session border controller 304.

According to one embodiment, a VoIP phone 312 may communicate with OG 302 through a wired or wireless connection 314 so that a user operating VoIP phone 312 may place or receive a VoIP phone call over network 300. Another VoIP phone 316 may communicate with TG 308 through a wired or wireless connection 318 so that another user operating VoIP phone 316 may receive or place a VoIP phone call over network 300. In this manner, two or more users may communicate with each other over network 300.

Figure 4:
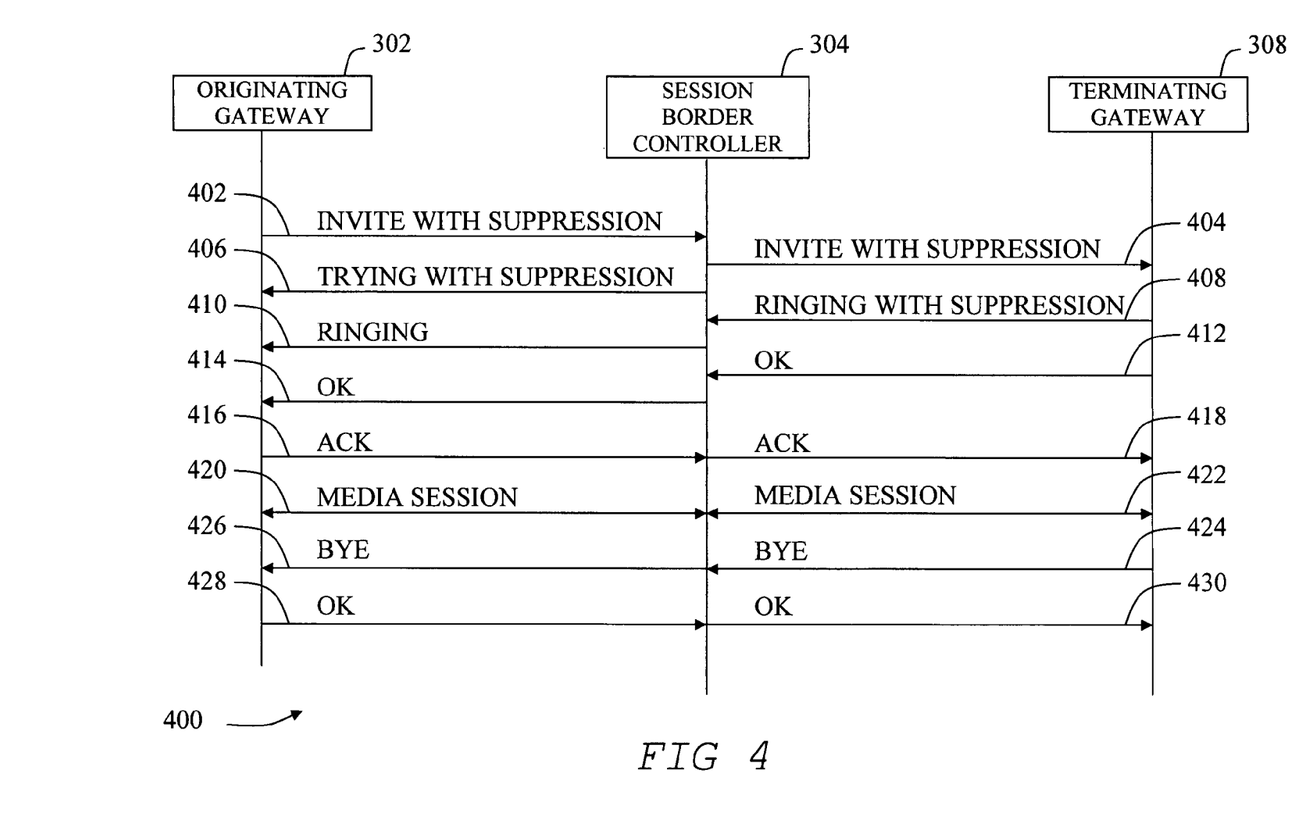
FIG. 4 shows a transaction diagram illustrating an exemplary negotiation flow of a suppressed header session, according to an embodiment of the present invention.

FIG. 4 shows a transaction diagram illustrating an exemplary suppressed header session negotiation flow 400, according to an embodiment of the present invention. Flow 400 may include the operations of sending 402 an INVITE WITH SUPPRESSION message from OG 302 to SBC 304 including a header suppression request. If the header suppression negotiation is successful, in the future at least one suppressible message header field may be omitted from the message header. As described, the standard Session Initiation Protocol is described in IETF-RFC3261, herein incorporated by reference in its entirety. According to IETF-RFC3261 section 4, "Header fields are named attributes that provide additional information about a message". According to IETF-RFC3261 section 6, the following are defined:

Header: A header is a component of a SIP message that conveys information about the message. It is structured as a sequence of header fields.

Header Field: A header field is a component of the SIP message header. A header field can appear as one or more header field rows. Header field rows consist of a header field name and zero or more header field values. Multiple header field values on a given header field row are separated by commas. Some header fields can only have a single header field value, and as a result, always appear as a single header field row.

Header Field Value: A header field value is a single value; a header field consists of zero or more header field values.

Finally, according to IETF-RFC3261 section 7.3.1, "Each header field consists of a field name followed by a colon and the field value." A preferred form of the header field would be the field-name followed by a colon, a single space, and then the field value.

Returning to FIG. 4, upon receipt of the INVITE WITH SUPPRESSION message, SBC 304 then forwards a corresponding INVITE WITH SUPPRESSION message to TG 308 in operation 404 and SBC 304 then replies to OG 302 with a TRYING WITH SUPPRESSION response message in operation 406 indicating SBC 304 has received the session request and is working to route the request to the requested destination. Further, by sending the TRYING WITH SUPPRESSION message in operation 406, SBC 304 acknowledges to OG 302 that it supports header suppression. In another exemplary network containing two or more intermediate SIP proxies, each intermediate proxy would respond to the INVITE WITH SUPPRESSION with a TRYING WITH SUPPRESSION message.

Figure 5:
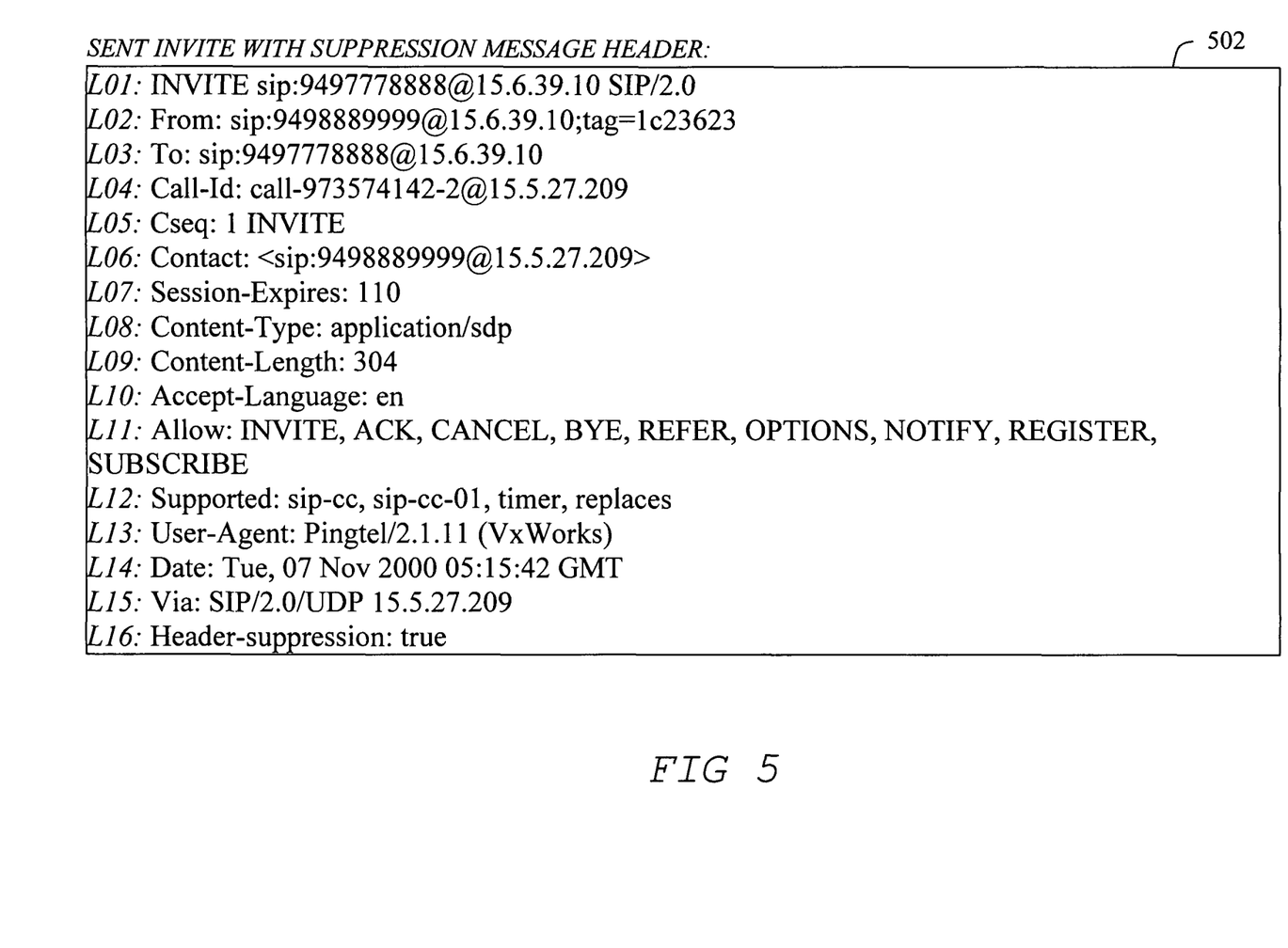
FIG. 5 shows an exemplary sent INVITE WITH SUPPRESSION message header corresponding to an invitation with header suppression, according to an embodiment of the present invention.

FIG. 5 shows an exemplary sent INVITE WITH SUPPRESSION message header 502 corresponding to the invitation with header suppression in operation 402, according to an embodiment of the present invention. In FIG. 5, lines L01: through L16: comprise the message header content of INVITE WITH SUPPRESSION message header 502, where the line indicators L01: through L16: are not a part of the message, but are merely used here to identify specific lines in message header 502. Following the message header begins the message body that contains the media session payload data. Line L16 of message header 502 includes an informational header field denoted as "Header-Suppression" with a logical value of "true" indicating header suppression is requested. In this manner, the suppression header field includes the preferred form herein shown in quotes "Header-suppression: true". The text portion between the preceding quote marks defines the preferred form of the suppression header field. Other white space may be located between the header field name, the intervening colon, and the header field value. The location of this field within the message header is not restricted. Further, once the suppression request is accepted, there is no further requirement that the suppression request be included in subsequent messages.

Figure 6:
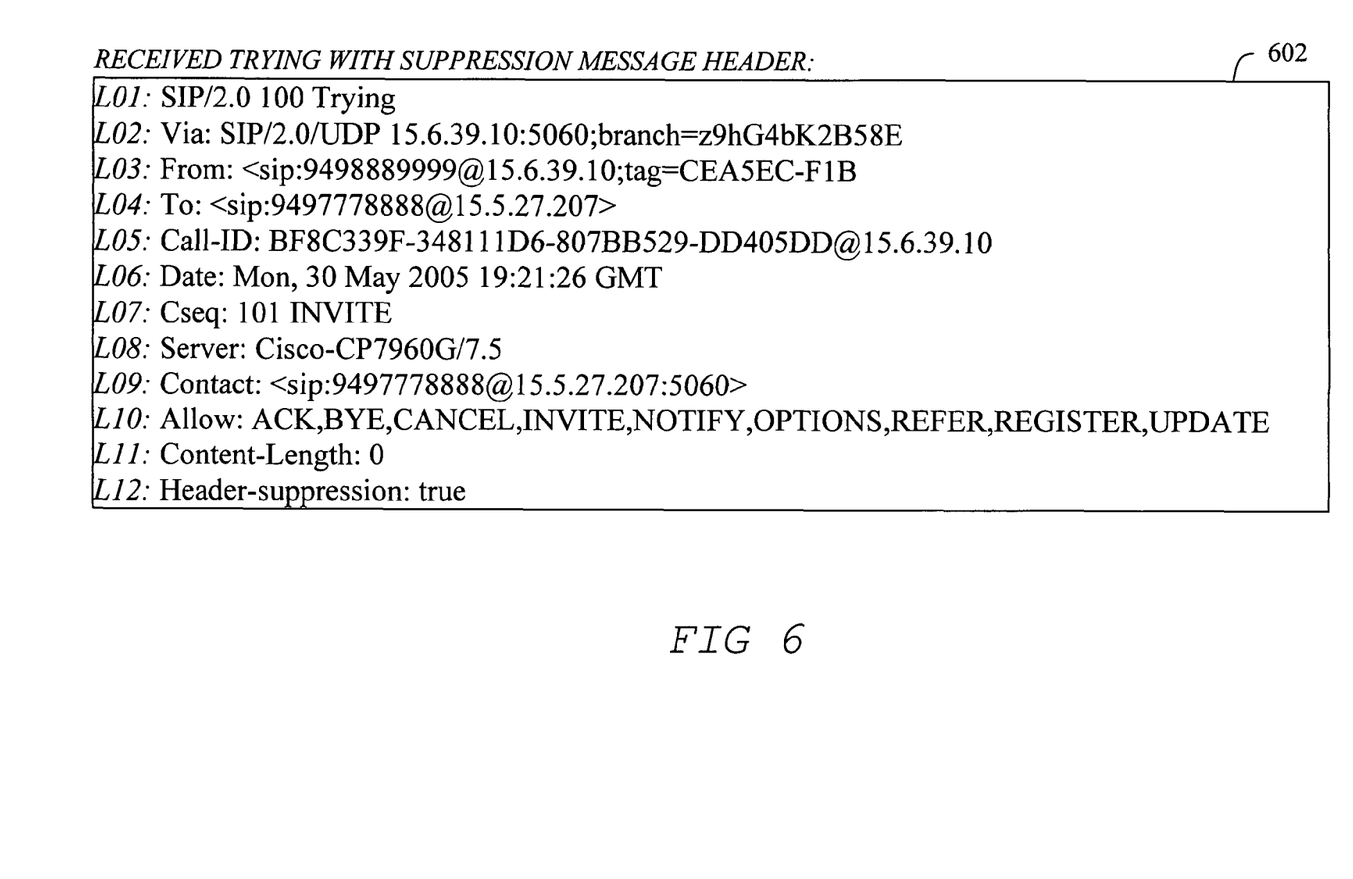
FIG. 6 shows an exemplary received TRYING WITH SUPPRESSION message header corresponding to a response to an invitation with header suppression, according to an embodiment of the present invention.

FIG. 6 shows an exemplary received TRYING WITH SUPPRESSION message header 602 corresponding to a response in operation 406, according to an embodiment of the present invention. In FIG. 6, lines indicators L01: through L12: are not part of the message header, but are merely used to identify specific lines in the message header 602. Following the message header begins the message body that may contain the media session payload data. Line L12 of message header 602 includes a responsive informational header field name "Header-Suppression" separated by a colon from a field value of "true" indicating header suppression is supported. The very first response from the peer should have all the header fields, even if header suppression is supported. Subsequent message headers may carry mandatory and changed header fields only. Other header fields including Max-forwards, Expires, Allow-Events, Content-Disposition, and the SDP parameters [v,o,s,c,t,m,a,i] may also be suppressed.

Response message headers, according to the SIP protocol, typically include the use of a three-digit code followed by a descriptive phrase. Exemplary header fields shown in FIG. 6 contains the same To, From, Call-ID, CSeq and branch parameter in the Via as the INVITE message shown in FIG. 5, which allows the calling device to correlate this response to the sent INVITE. Once adjacent SIP peers have indicated compliance with the suppressed header protocol, only the SIP headers that are required and the headers that have changed during a unique dialog are exchanged between the SIP peers during a particular suppressed header field message exchange session. Depending on the particular feature and/or sub-feature, some header fields may be considered mandatory or required, while others may not. Unchanged SIP headers are not exchanged at all once header field suppression is enabled. This omission of unchanged or unnecessary header information not only helps in cutting down the amount of parsing to be done by each SIP peer, but also conserves network bandwidth, since each subsequent message will carry only the required and changed SIP headers fields.

The reduced parsing directly results in an increase in the performance of that device, by freeing up CPU and memory, while the reduced network bandwidth requirement provides an increase in the available bandwidth for other, concurrent services over the same inter-peer link. Conversely, if the peer does not support this header suppression mechanism, it indicates that in a 100 Trying message without a "Header-suppression: true" and thereafter, both of the devices will exchange all headers. Alternatively, the response message header may include the header field "Header-Suppression: False" to positively indicate header suppression is not supported. However, the header suppression request is forwarded on the network toward TG 308 so that subsequent nodes may be aware and take advantage of the suppressed header protocol, if enabled and capable of header suppression. If header suppression is not supported by the peer endpoint, communication with that peer may proceed with the traditional SIP processing by processing and forwarding full header message information. Calls using various in-dialog refresh mechanisms (eg: reINVITE/OPTIONS/UPDATE) while also using header suppression may see more benefit as compared to calls using a refresh operation with no header suppression.

Returning to FIG. 4 and a discussion of flow 400, once TG 308 receives the invite message in operation 404 it responds with a ringing message in operation 408 to SBC 304 to indicate both the invite to TG 308 was successful and the call receiver is available to answer the call. When TG 308 receives an INVITE WITH SUPPRESSION message and is capable of supporting header suppression, the first response from TG 308 to SBC 304 will include "Header-suppression: true", an equivalent indicator, and/or argument. This response will enable header suppression between SBC 304 and TG 308 in subsequent messages. SBC 304 forwards the ringing message to OG 302 in operation 410 to complete the return path of the original invite with suppression originating from OG 302 in operation 402. Once the called party answers the call, an OK message is generated from TV 308 to SBC 304 in operation 412, and SBC 304 forwards an OK message to OG 302 in operation 414. Once OG 302 receives a confirmation the call was answered, OG 302 sends an ACK message to SBC 304 in operation 416, then SBC 304 sends an ACK message to TG 308. At this point, the SIP session is established between the calling party and the called party.

Flow 400 continues with setting up the media session between adjacent nodes in operations 420 and 422, respectively. When the call is completed, one party will "hang up" or otherwise indicate the call is completed. In one example, if the called party terminates the call, TG 308 will generate a BYE message to SBC 304 in operation 424. SBC 304 forwards a BYE message to OG 302 in operation 426. OG 302 then acknowledges the termination of the call by sending an OK message to SBC 304 in operation 428. SBC 304 then forwards an OK message to TG 308 in operation 430 to conclude flow 400. Although only three network nodes (302, 304, 308) and types are shown in exemplary network 300 and flow 400, this number of network nodes and types is not considered limiting, and may instead include a plurality of two or more network nodes traversing various levels of network hierarchy.

The suppressible message header field names include: Via, Date, Supported, User-Agent, Allow, Max-Forwards, Contact, Expires, Allow-Events, Content-Type, Content-Disposition, Content-Length and Session Description Protocol (SDP) parameters [v, o, s, c, t, m, a, i lines] if there is no change to the associated header data and/or argument. SDP is specified by IETF-RFC2327, herein incorporated by reference in its entirety, and is intended for describing multimedia sessions for the purposes of session announcement, session invitation, and other forms of multimedia session initiation. The suppressible SDP parameters [v, o, s, c, t, m, a, i] correspond to session/media descriptions: v=(protocol version), o=(owner/creator and session identifier), s=(session name), e=(email address), t=(time the session is active), m=(media name and transport address), a=(zero or more session/media attribute lines), and i=(session information). In this manner, any header field that is not mandatory and does not change may be suppressed, so this list is not considered limiting.

Figure 7:
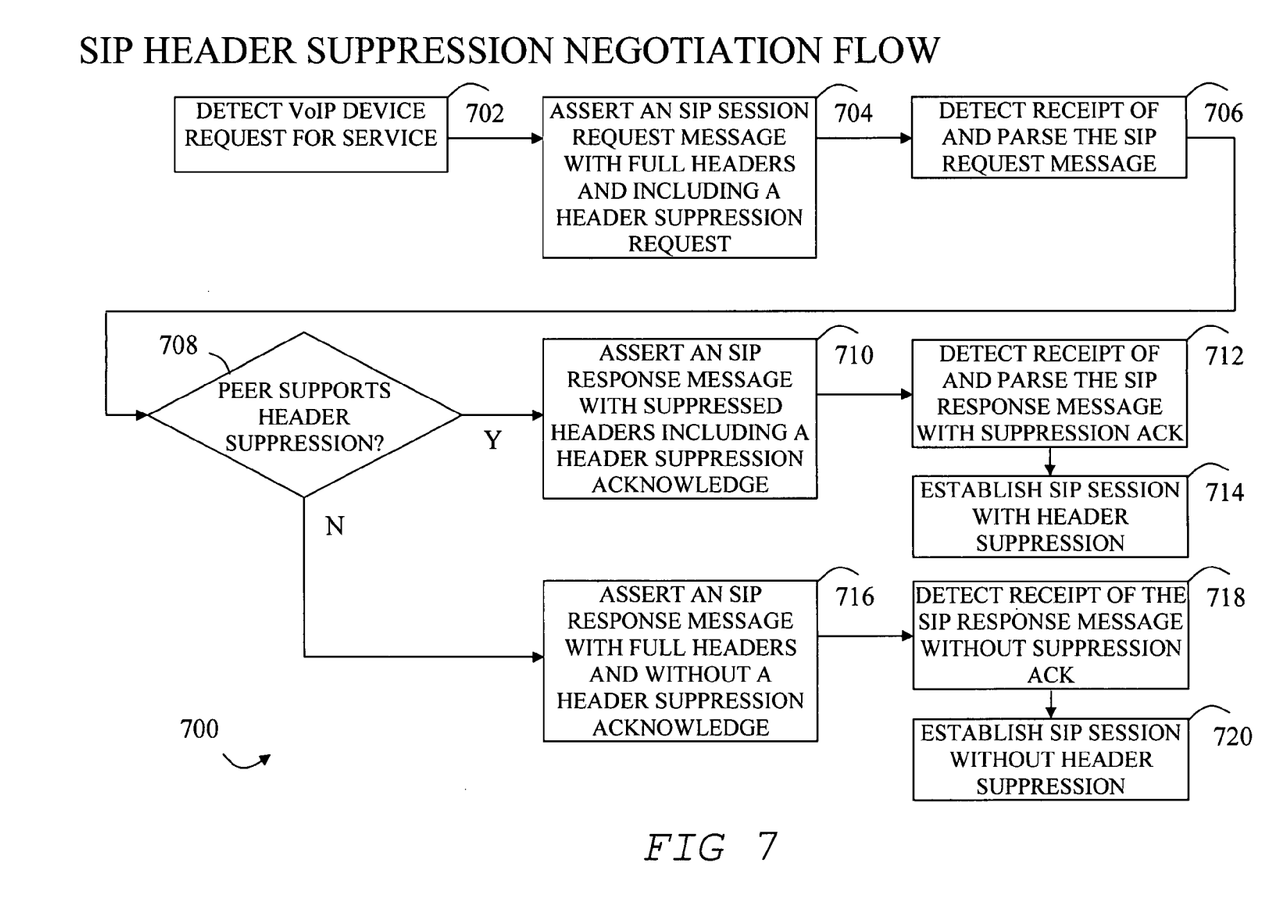
FIG. 7 shows an exemplary header suppression negotiation flow for peer network nodes, according to an embodiment of the present invention.

FIG. 7 shows an exemplary header suppression negotiation flow 700 for peer network nodes, according to an embodiment of the present invention. In reference to FIGS. 3-7, flow 700 begins in operation 702 with OG 302 detecting a VoIP device service request from VoIP phone 312 including an operation to initiate a call to another party. Initiating a call can include a user entering a phone number into a handset, selecting a phone number to call from a menu item on a display, and/or executing a call-back operation related to a received call on or associated with VoIP phone 312.

Once the VoIP call is initiated by a user, flow 700 continues in operation 704 where OG 302 may assert (e.g. generate and send) an SIP invite message with full headers, including a header suppression request, to a peer node SBC 304 including the text string "Header-suppression: true" or an equivalent indicator and/or argument. SBC 304 detects receipt of the SIP session request message in operation 706 and parses the received header to determine the presence of the header suppression request. SBC 304 then determines whether header suppression is supported with peer network node OG 302 in operation 708. If header suppression is supported between these peer network nodes, flow 700 continues with operation 710 where SBC 304 may then generate and send to OG 302 a received invite message 602 as discussed in reference to FIG. 6. OG 302 detects receipt of the response message and parses the message header to determine the presence of a header suppression response in operation 712. OG 302 then determines whether header suppression is supported in the negotiated session with peer node SBC 304 in operation 708. OG 302 may make this determination by examining the received header in operation 706 to determine the presence of header field "Header-suppression: true" or an equivalent indicator.

If header suppression is supported, flow 700 continues by establishing an SIP session between OG 302 and SBC 304 with header suppression enabled. In this manner, both network bandwidth and device processing resources may be conserved. However, in operation 708, if the requested peer does not support header suppression, SBC 304 may generate and send to OG 302 a received invite message without a suppression acknowledgement in operation 716. OG 302 detects receipt of the response message and parses the message header to determine the absence of a header suppression response in operation 718. Finding no header suppression response, flow 700 continues with establishing a SIP session between OG 302 and SBC 304 without using header suppression.

Figure 8:
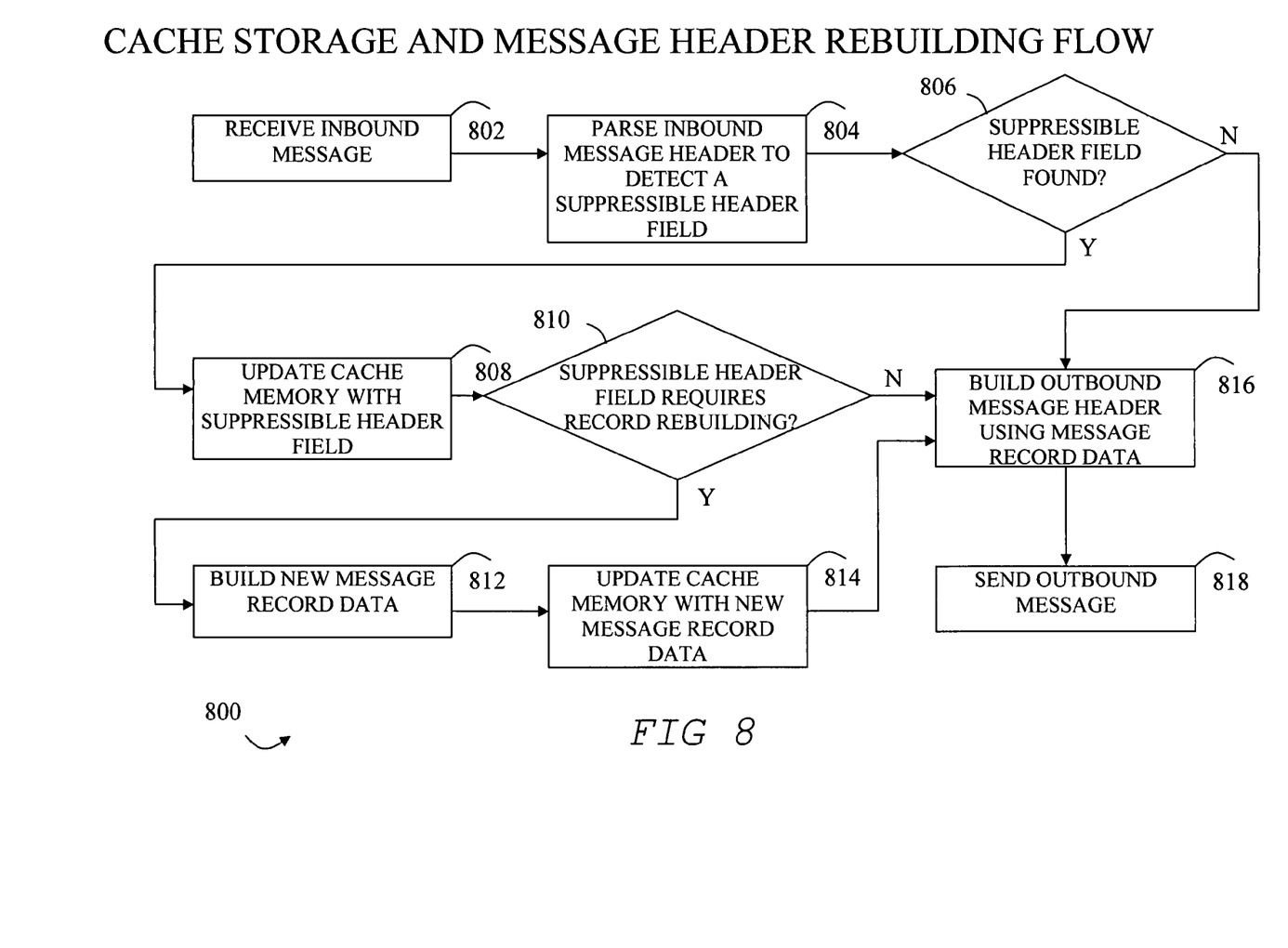
FIG. 8 shows an exemplary cache storage and message header rebuilding flow, according to an embodiment of the present invention.

FIG. 8 shows an exemplary cache storage and message header rebuilding flow 800, according to an embodiment of the present invention. Flow 800 describes operations included in receiving an inbound message and sending and outbound message for a network node participant in one or more SIP sessions where at least one peer node supports header field suppression. Briefly in reference to FIG. 3, SBC 304 may receive inbound messages on network 306 and assert outbound messages on network 310 in a flow-through mode. Alternatively, SBC 304 may receive inbound messages on network 306 and may assert outbound messages on network 306 in a reply mode. In this manner, any network node may receive an inbound message on any connected network and assert outbound messages on any connected network. The number of connections, communication medium, and the network topology are not considered limiting.

Referring to FIGS. 3 and 8, flow 800 may include an exemplary network node, such as SBC 304, receiving an inbound message in operation 802. The inbound message may include a message header corresponding to the SIP protocol including a suppressed header format according to an embodiment of the present invention. For the purposes of this disclosure, the phrase corresponding to the SIP protocol in this context means that although most of the content of a particular message header will comply with the requirements of the SIP protocol, some elements of the session protocol may be changed or waived in order to facilitate header suppression. SBC 304 may parse the received inbound message header to detect new header data in operation 804. Operation 806 determines if a suppressible header field is found.

If a suppressible header field is found, and header suppression is enabled, then the suppressible header field must carry new information. Otherwise, the suppressible header field would have been omitted. If a suppressible header field is found, flow 800 moves to operation 808 where a cache memory within the receiving network node is updated with the new header field data. Flow 800 continues with determining whether the new header field requires rebuilding of any message header records in operation 810. Message header records are those command, data, and/or argument fields that may be directly copied into a predetermined position within an outbound message. Hence, instead of parsing and generating an outbound message header in real-time based on the inbound message header data for every received message header, certain portions of the outbound message header may be pre-computed and stored in a corresponding location of a memory for rapid retrieval and insertion into an outbound message header template. The template may comply with the format shown in the exemplary formats of either of FIG. 5 or 6. In this manner, computation delays for unchanged message header fields may be eliminated since relevant portions of an outbound message header may be directly copied from memory, thus conserving both time and processing power.

If the new or newly changed header data requires rebuilding of any portion of the outbound message header template, flow 800 moves to build the new message record data in operation 812. Once the new record data is built, the new record data is updated into the memory in operation 814 for use in building the current and possibly future outbound message headers. For each subsequent use of the pre-computed outbound header information, computation time and message throughput delays are saved. Flow 800 continues with building the outbound message header using the message record data in operation 816 and sending the outbound message in operation 818.

Alternatively, if the parsed inbound message does not contain suppressible header file data as determined in operation 806, then flow 800 continues with building the outbound message header using message record data in operation 816 and sending the outbound message in operation 818. Hence, if no new header information is found, then the outbound message generated in response to the received message will have no changes to non-time sensitive fields and/or values in the outbound message header. However, if the parsed inbound message does contain new header data but that new header data does not require record rebuilding as determined in operation 810, flow 800 continues with building the outbound message header using message record data in operation 816 and sending the outbound message in 818. In this latter case, the new data may be stored in memory and used directly without modification.

SIP devices may store information in and retrieve information from a readily accessible memory such as a cache memory. Where the information may be stored briefly and/or used frequently, this process of storage and ready retrieval may be termed caching, or using a cache memory. Prototypical headers of each SIP dialog may be computed, cached, and later reused for further call processing for that specific dialog only, instead of parsing and building message headers every time. A prototypical header is one cached header field record that conforms to the expected sent or received header format and may be used instead of a missing or suppressed header in a local computation. Further, when subsequent messages need to be built, (e.g. hold/resume, session timer etc) the cached records of prototype header fields and/or values, the prototype header, may be used to blindly construct at least some portions of the appropriate outgoing message header instead of parsing and/or building each element of the message on demand or in real-time.

As part of the initial dialog establishment process, a gateway or other SIP network device may parse and cache the headers in the INVITE/1xx (Provisional)/Final response [2xx (Success), 3xx (Redirection), 4xx (Client Error), 5xx (Server Error), 6xx (Global Failure)] and use them for further call processing. Including 4xx (Client Error) and 5xx (Server Error) messages, header suppression is applicable for all error response messages. A portion of the header cached in a received or previously generated 1xx messages may be used in further message exchange under certain conditions. Since caching is performed local to the SIP device, whether or not the peer supports caching, a performance increase may be realized due to the reduction in processing time and processing latency on the local device. VoIP calls using in-dialog refresh mechanisms (e.g. reINVITE/OPTIONS/UPDATE) along with suppressed header techniques as disclosed may realize even more benefit when compared with traditional calls using Refresh mechanism and no header caching. Alternatively, using header suppression and/or header caching may also provide extra call handling capacity to a SIP device according to one or more embodiments of the present invention, when compared with a traditional SIP device. By providing extra call handling capacity, service providers may reduce costs per VoIP call, while reducing congestion and/or call latency due to improved bandwidth utilization and/or reduced average message size.

Figure 9:
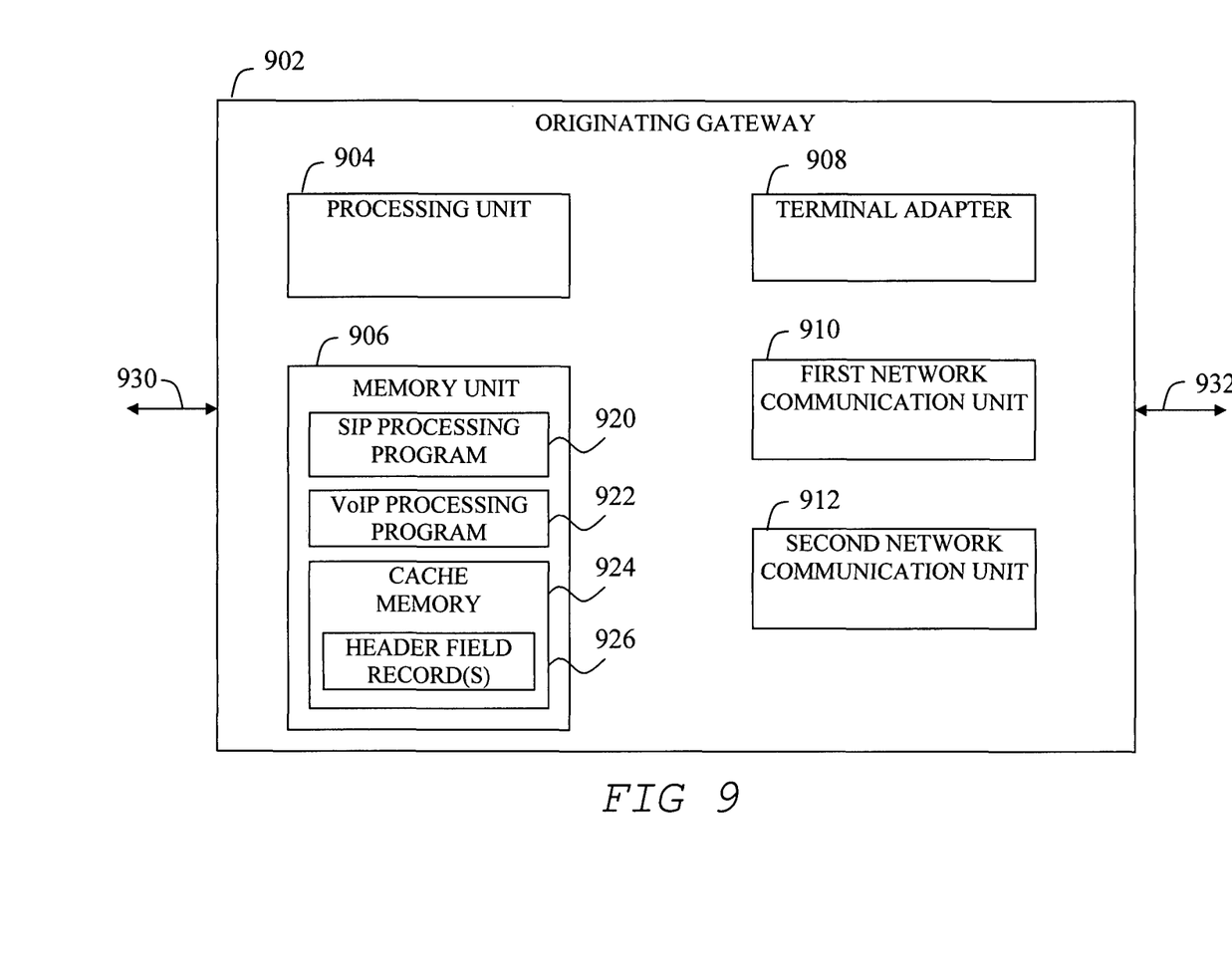
FIG. 9 shows a block diagram view of an exemplary originating gateway (OG), according to an embodiment of the present invention.

FIG. 9 shows a block diagram view of an exemplary originating gateway (OG) 902, according to an embodiment of the present invention. OG 902 is a particular embodiment of OG 302 shown in FIG. 3 and may include a processing unit 904, a memory unit 906, a terminal adapter 908, a first communication unit 910, and/or a second communication unit 912. Processing unit 904 may include a computer processor configured to fetch, decode, and execute instructions in one or more computer programs. Memory unit 906 may include one or more memory devices configured to store and retrieve information including a Random Access Memory (RAM), a Read Only Memory (ROM), a cache memory, a content addressable memory (CAM), and/or a register file. Memory unit 906 may include magnetic, optical, and/or electronic storage and retrieval technologies, and may store programs including an SIP processing program 920, and/or a VoIP processing program 922. SIP processing program 920 may be included in a computer readable medium on which is stored one or more computer instructions for operations related to one or more embodiments of the present invention. Similarly, VoIP processing program 922 may include computer instructions for operations related to placing and/or receiving VoIP telephone calls. In one example, by a user lifting a VoIP telephone receiver, processing unit 904 running a VoIP processing program 922 may detect this lifting of the receiver and provide a dial-tone into the VoIP earpiece, or other indicator the VoIP phone is ready for use in placing a call. Processing unit 904 may fetch, decode, and execute these and/or other computer instructions in order to carry out operations related to one or more embodiments of the present invention. Memory unit 906 may also include a cache memory 924 configured to store and retrieve information including discrete data individually and/or related data in one or more data records, including one or more header field records 926. Message header information may be stored discretely as individual data elements, and transformed according to instructions in SIP processing program 920 into one or more data records for direct inclusion into an outbound message header.

Terminal adapter 908 may translate between signal types and/or protocols to provide communication between various user devices over various communication channels. For example, terminal adapter 908 may translate between message packet information and a VoIP telephone handset, a video display, and/or any user interface, including a transition to a wireless Local Area Network (LAN). Briefly in reference to FIG. 3, terminal adapter 908 may provide an interface between VoIP phone 312 and OG 302 by translating some portion of the information between communication path 306 and communication path 314. First network communication unit 910 may provide communication between OG 902 and a first network 930, while second network communication unit 912 may provide communication between OG 902 and a second network 932. First network 930 may comprise a Local Area Network (LAN) at a first level of network hierarchy, and second network 932 may comprise a Wide Area Network (WAN) at a second level of network hierarchy, where OG 902 routes traffic between the first network 930 and second network 932.

Figure 10:
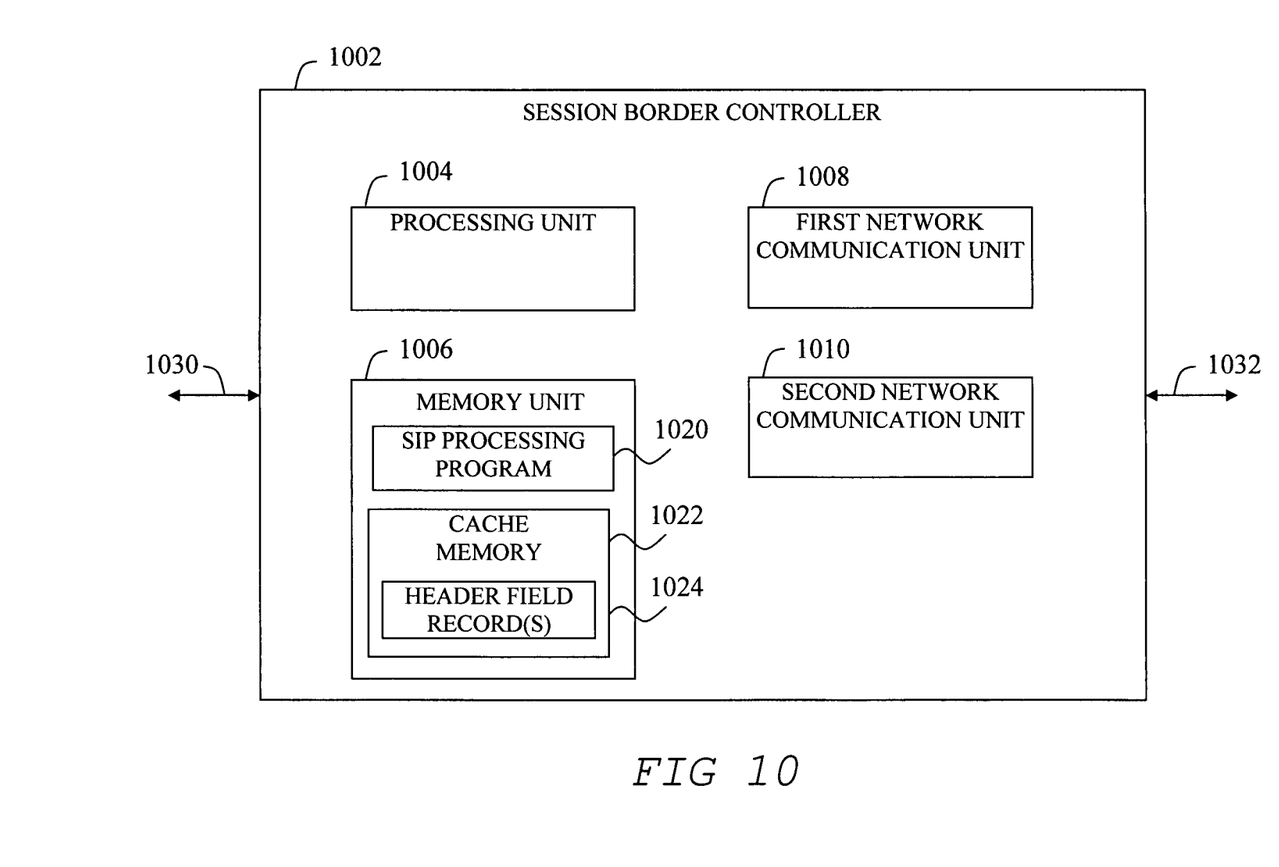
FIG. 10 shows a block diagram view of an exemplary session border controller (SBC), according to an embodiment of the present invention.

FIG. 10 shows a block diagram view of an exemplary session border controller (SBC) 1002, according to an embodiment of the present invention. SBC 1002 is a particular embodiment of SBC 304 shown in FIG. 3 and may include a processing unit 1004, a memory unit 1006, a first network communication unit 1008, and/or a second network communication unit 1010. Processing unit 1004 may include a computer processor configured to fetch, decode, and execute instructions in one or more computer programs. Memory unit 1006 may include one or more memory devices configured to store and retrieve information including a Random Access Memory (RAM), a Read Only Memory (ROM), a cache memory, a content addressable memory (CAM), and/or a register file. Memory unit 1006 may include magnetic, optical, and/or electronic storage and retrieval technologies, and may store programs including an SIP processing program 1020. SIP processing program 1020 may be included in a computer readable medium on which is stored one or more computer instructions for operations related to one or more embodiments of the present invention. Processing unit 1004 may fetch, decode, and execute these and/or other computer instructions in order to carry out operations related to one or more embodiments of the present invention. Memory unit 1006 may also include a cache memory 1022 configured to store and retrieve information including discrete data individually and/or related data in one or more data records, including one or more header field records 1024. Message header information may be stored discretely as individual data elements, and transformed according to instructions in SIP processing program 1020 into one or more data records for direct inclusion into an outbound message header.

First network communication unit 1008 may provide communication between SBC 1002 and a first network 1030, while second network communication unit 1010 may provide communication between SBC 1002 and a second network 1032. SBC 1002 may be located in a communication path between the originator of a VoIP call, denoted as the calling party, and the receiver of the VoIP call, denoted as the called party so that SBC 1002 can intercept the VoIP call, purportedly as the called party, and place another call to the actual called party. In this manner, SBC 1002 may act as an IP-to-IP gateway for both signaling and media traffic comprising the VoIP call.

Figure 11:
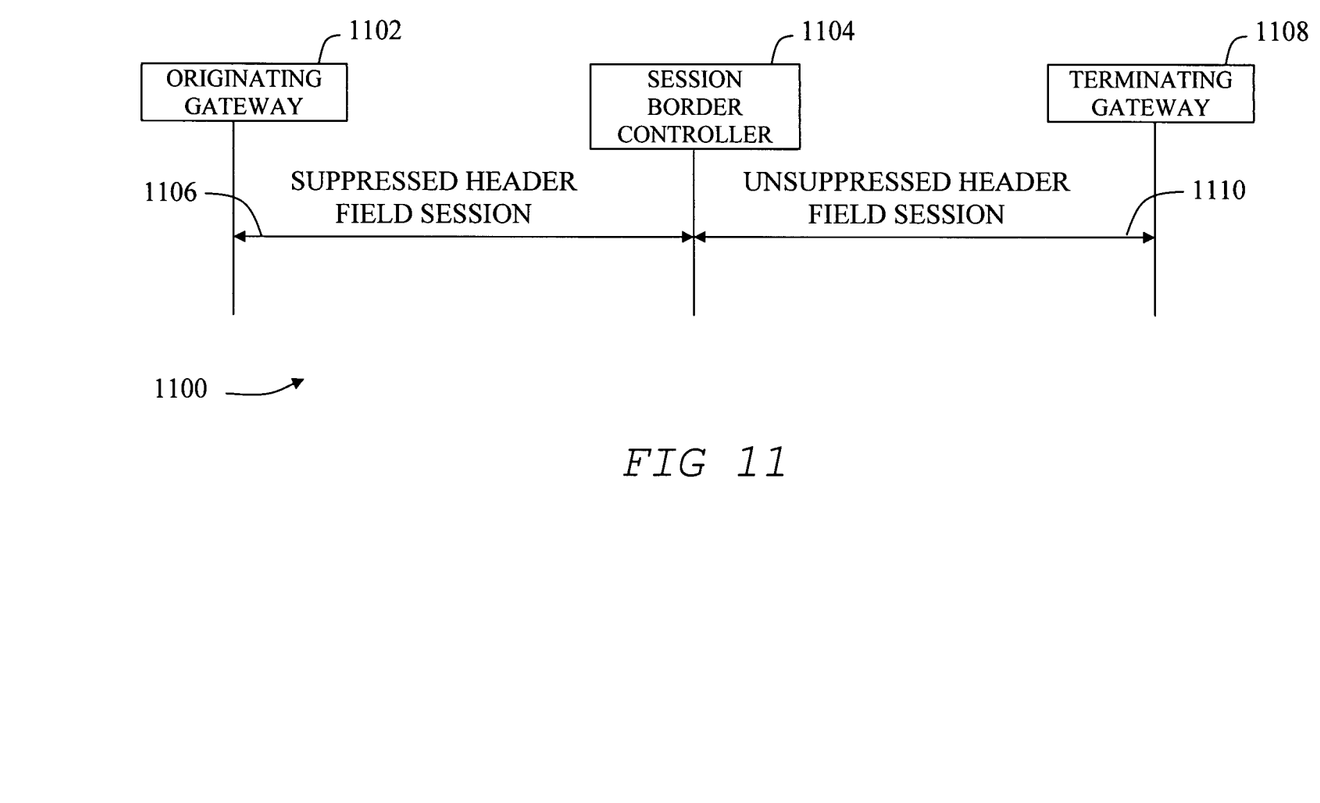
FIG. 11 shows a block diagram view of a portion of a network configured to simultaneously support both suppressed and unsuppressed header field message exchange sessions, according to an embodiment of the present invention.

FIG. 11 shows a block diagram view of a portion of a network 1100 configured to simultaneously support both suppressed and unsuppressed header field message exchange sessions, according to an embodiment of the present invention. A SIP communication path between two endpoints (e.g. nodes/communicating devices) and may traverse various networks where some intermediate network nodes may support header suppression, while others do not. In the cases where an intermediate segment does not support header suppression, two options are possible. First, another network segment may be chosen that is suppression enabled. Second, where an alternative network segment is not available, all SIP traffic through the non-suppression segment may carry full headers, where no benefit is realized due to header suppression on this communication segment. However, either subsequent and/or previous network segments may support header suppression. Thus, partial suppression along at least some portions of the communication path may provide a benefit to the suppression-enabled nodes and connecting network segments where suppression is used.

For a suppression-enabled node on a boundary between a network connection with a non-suppression node and a network connection with a suppression-enabled node may reconstruct the suppressed header information for a non-suppression enabled node. In this manner, a suppression enabled network node may receive incoming message headers with header fields suppression enabled while generating outgoing message headers with header field suppression not enabled, or vice versa.

In the exemplary network 1100, both OG 1102 and SBC 1104 are suppression enabled. OG 1102 is a particular embodiment of OG 302, while SBC 1104 is a particular embodiment of SBC 304 both shown in FIG. 3. Hence, OG 1102 and SBC 1104 may support the establishment of a suppressed header field message exchange session 1106. Conversely, while SBC 1104 may be suppression enabled, TG 1108 in network 1100 may not be suppression enabled so that the communication segment between SBC 1104 and TG 1108 may support the establishment of an unsuppressed header field message exchange session 1110.

Although the invention has been described with respect to particular embodiments, this description is only an example of the invention's application and should not be taken as a limitation. Consequently, the scope of the invention is set forth in the following claims.

We claim:

1. A communication apparatus including a communication unit configured to send and receive session initiation protocol (SIP)-based messages with regard to a peer on a network, each SIP-based message having a message header configured to include a plurality of headers, each header including a text-based field name and a corresponding field value, wherein the headers form a set of suppressible headers and a set of mandatory headers, the set of mandatory headers including a suppression header having a text-based suppression field name and a corresponding suppression field value, and the set of suppressible headers being changeable from message to message,     the communication apparatus being operable to configure the suppression field value in an initial one of the messages sent to the peer to request that a header-suppressed SIP-based communication session be initiated with the peer, and     the communication apparatus being further operable, in response to an acknowledgment indicating that the peer supports header suppression, to communicate with the peer such that:

a given one of the SIP-based messages exchanged between the communication apparatus and the peer omits suppressible headers in the set of suppressible headers with field values that are not changed with respect to a message preceding the given message, and         the given message includes suppressible headers in the set of suppressible headers with field values that are changed with respect to the message preceding the given message, wherein a first selection of the set of suppressible headers included in the given message are different from a second selection of the set of suppressible headers included in at least one other SIP-based message exchanged between the communication apparatus and the peer during the communication session,     wherein the field names for the set of suppressible headers are selected from the group consisting of Via, Date, Supported, User-Agent, Allow, Max-Forwards, Contact, Expires, Allow-Events, Content-Type, Content-Disposition, and Content-Length.

2. The apparatus of claim 1, wherein the SIP-based messages are configured to communicate Voice over Internet Protocol (VoIP) information.

3. The apparatus of claim 1, wherein each suppressible header field includes a suppressible Session Description Protocol (SDP) parameter that is selected from the group consisting of v, o, s, c, t, m, a, and i.

4. The apparatus of claim 1, wherein the header fields further comprise a plurality of mandatory header fields, the mandatory header fields being unsuppressible.

5. The apparatus of claim 1, wherein the suppression header field includes the preferred form herein shown in quotes "Header-suppression: true".

6. A method of establishing a suppressed header message exchange session using session initiation protocol (SIP)-based messages, each SIP-based message having a plurality of text-based message header fields that include suppressible header fields and a suppression header field, the header fields having values that are changeable from message to message, and inclusion of particular ones of the suppressible header fields being changeable from message to message, the method comprising the operations of:

asserting the suppression header field in an initial one of the SIP-based messages to indicate a request to establish the suppressed header message exchange session on a network;

receiving an acknowledgement of the request to establish the suppressed header message exchange session:

subsequent to the acknowledgement of the request, transmitting a first SIP-based message that includes the suppressible header fields; and     subsequent to the transmission of the first SIP-based message, transmitting a given one of the SIP-based messages that is omits a first selection of the suppressible header fields that are not changed with respect to the first SIP-based message to thereby establish the suppressed header field message exchange session,     wherein each message header field includes a header field name and zero or more header field values, and wherein the first selection of the suppressible header fields omitted in the given message are different from a second selection of the suppressible header fields omitted in at least one other SIP-based message transmitted during the suppressed header field message exchange session, and     wherein the header field names of the suppressible header fields are selected from the group consisting of Via, Date, Supported, User-Agent, Allow, Max-Forwards, Contact, Expires, Allow-Events, Content-Type, Content-Disposition, and Content-Length.

7. The method of claim 6, wherein the suppressed header message exchange session provides Voice over Internet Protocol (VoIP) communication.

8. The method of claim 6, wherein each suppressible header field includes a suppressible Session Description Protocol (SDP) parameter is selected from the group consisting of v, o, s, c, t, m, a, and i.

9. The method of claim 6, wherein the SIP-based initial message includes a text string with the preferred form herein shown in quotes "Header-suppression: true".

\* \* \* \* \*